(12) United States Patent
Gras

(10) Patent No.: US 7,734,644 B2
(45) Date of Patent: Jun. 8, 2010

(54) SYSTEM AND METHOD FOR HIERARCHICAL INFORMATION RETRIEVAL FROM A CODED COLLECTION OF RELATIONAL DATA

(76) Inventor: Seaton Gras, 1010 Valley St., Seattle, WA (US) 98109

( * ) Notice: Subject to any disclaimer, the term of this patent is extended or adjusted under 35 U.S.C. 154(b) by 916 days.

(21) Appl. No.: 11/429,303

(22) Filed: May 5, 2006

(65) Prior Publication Data

US 2006/0253462 A1 Nov. 9, 2006

Related U.S. Application Data

(60) Provisional application No. 60/678,343, filed on May 6, 2005.

(51) Int. Cl.
*G06F 7/00* (2006.01)
(52) U.S. Cl. ...................... 707/770; 707/771
(58) Field of Classification Search ............ None
See application file for complete search history.

(56) References Cited

U.S. PATENT DOCUMENTS

| | | | |
|---|---|---|---|
| 5,675,788 A | 10/1997 | Husick et al. | |
| 5,717,914 A | 2/1998 | Husick et al. | |
| 5,742,816 A | 4/1998 | Barr et al. | |
| 5,924,090 A | 7/1999 | Krellenstein | |
| 6,339,767 B1 | 1/2002 | Rivette et al. | |
| 6,526,440 B1 | 2/2003 | Bharat | |
| 6,690,397 B1 | 2/2004 | Daignault, Jr. | |
| 6,760,720 B1 | 7/2004 | De Bellis | |
| 6,810,415 B2 | 10/2004 | Allen et al. | |
| 6,868,525 B1 | 3/2005 | Szabo | |
| 6,907,424 B1 | 6/2005 | Neal et al. | |
| 6,920,448 B2 | 7/2005 | Kincaid et al. | |
| 6,927,779 B2 | 8/2005 | Mannion et al. | |
| 6,947,936 B1 | 9/2005 | Suermondt et al. | |
| 6,961,731 B2 | 11/2005 | Holbrook | |
| 6,963,867 B2 | 11/2005 | Ford et al. | |
| 6,990,482 B1 | 1/2006 | Piotrowski et al. | |
| 7,028,253 B1 | 4/2006 | Lieberman et al. | |
| 2002/0059210 A1* | 5/2002 | Makus et al. | 707/3 |
| 2002/0087599 A1* | 7/2002 | Grant et al. | 707/513 |
| 2002/0091836 A1 | 7/2002 | Moetteli | |
| 2002/0138487 A1* | 9/2002 | Weiss et al. | 707/10 |
| 2002/0194166 A1 | 12/2002 | Fowler | |
| 2003/0112234 A1 | 6/2003 | Brown et al. | |
| 2004/0068514 A1 | 4/2004 | Chundi et al. | |
| 2005/0037816 A1 | 2/2005 | Morita et al. | |
| 2005/0060287 A1 | 3/2005 | Hellman et al. | |

(Continued)

*Primary Examiner*—Cam Y T Truong
(74) *Attorney, Agent, or Firm*—Boswell IP Law, PLLC; J. Mason Boswell

(57) ABSTRACT

A system for information retrieval from a collection of hypermedia data over a distributed network is presented. The system includes a data storage system that is a collection of hypermedia data. The collection of hypermedia data also has a number of hyperlinks to items of hypermedia content, and the hyperlinks are each respectively associated with at least one code value generated based on the content of the respective hypermedia content. The system also includes an application that receives progressive user input and iteratively builds a user search code value according to the user input. It matches the user search code value to at least a portion of the hypermedia content code value for the hyperlinks in the data storage to identify each such associated hyperlink to a particular information retrieval data set.

9 Claims, 8 Drawing Sheets

U.S. PATENT DOCUMENTS

2005/0071804 A1 3/2005 Miserocchi
2005/0073522 A1 4/2005 Aholainen et al.
2005/0225559 A1 10/2005 Robertson et al.

* cited by examiner

SYSTEM AND METHOD FOR HIERARCHICAL INFORMATION RETRIEVAL FROM A CODED COLLECTION OF RELATIONAL DATA

This application claims priority to U.S. Provisional Application 60/678343, filed May 6, 2005.

TECHNICAL FIELD

The invention relates to information retrieval from networks such as the Internet; more particularly, it relates to a system and method for hierarchical information retrieval from a coded collection of relational data.

BACKGROUND OF THE INVENTION

The veritable explosion of the Internet has created a problem of altogether too much information. The user is overwhelmed by the simplest of searches. Every website owner strives to have their site on the top of the search results. Few web users look at any sites beyond the first few pages or 50 sites from result sets ranging in the multi-million. The problem stems, in part, from the use of ambiguous words to drive the search queries. Additionally, the sheer number of websites continues to increase the difficulty of finding the right information.

One alternative approach has been to build directories. The difficulty of the directories is still the issue of ambiguity. These directories are by no means an attempt to search the Internet but rather a way to organize a small selection of the billions of web pages currently available. These handpicked sites are very limited in absolute terms or numbers. More importantly, the Internet is growing at such a rapid rate that static directories are, by their very nature, outdated. There needs to be a way that even the brand new pages can be organized.

There are many drawbacks with current Internet search methods such as Google and Yahoo. Many relatively robust search engines exist today. All that Google does is search, and yet, they have results that are full of ambiguity and have not yet integrated a method of drill down to reach search results. These companies all continue to refine the use of algorithms dependent upon interpretations of the user's keystrokes or weighting the records based on complex calculations of proximity, frequency, and position.

Google and the pack of search engines have engaged in a race to the finish line trying to solve the frustrating problem of relevance. There is no way that the computer can consistently and reliably determine the intent of the user. In other words, the keystrokes of the user have been analyzed in conjunction to other queries to attempt to understand, or anticipate, the users' intention. But the user may have an active mind and able to shift between many diverse subjects. Therefore, the computer is constantly baffled by this problem. These companies have invested millions to develop Artificial Intelligence to solve this problem and to make the text box interface effective, but without apparent avail.

This is especially difficult when so many words are ambiguous. In particular, the more common words tend to have multiple meanings. It is for this reason, that those more educated users have a clear advantage when using the standard text box combined with a modicum of skill in Boolean logic. The educated user has a broader vocabulary and can thereby express their objective in a more precise manner.

Language-based searches have various unsolved problems: children are exposed to inappropriate material; words have more than one meaning; keystroke errors result in totally wrong information; keystroke requires skill sets that are not universal; the need to remember words and names; the need to read to understand results; the need for extensive vocabulary to assess results; and international use of the Internet is comprised of many languages.

Oftentimes, when using words for search parameters, the user is faced with sorting through the disparate results. Currently, search results present websites that contain the selected word but the subject matter at the same time be completely unrelated to the searcher's objective. For instance, if a user searches for flamingo they see the following results:

1) Flamingo Hotel and Resort, Las Vegas;

2) Flamingo, Scientific Classification;

3) Harper Collins Publishers, UK;

4) Flamingo Gardens, Florida;

5) Flamingo Land Theme Park and Zoo, United Kingdom;

6) Flamingo Table tennis, located in Gouda, Netherlands;

7) Flamingo World, for free online coupons; and finally, 8) xxx.com, in which the word flamingo appears but which features erotic stories of bondage.

If a teacher asks a young student to research Flamingo birds on the Internet, the unfortunate student has to read through the mass of unrelated sites to find one site that offered some appropriate information. Even so, the best and most useful sites are not found in the first 20 results, they tend to show up after 50 sites, or more. In particular, a somewhat illiterate student is stymied by words being the exclusive method to understand the multitude of website hits.

Similarly, a search using "Hilton Paris" results in stories about Paris Hilton (including her personal tapes) and Paris, France (however, the latter is presented in a lower priority due to lower interest, or current popularity). Young people are very fond of Paris Hilton.

The World Wide Web is cluttered with everything imaginable. Now, web surfers are deluged with links to sites that have nothing to do with their target subject matter. Ironically, the very abundance of results is the main limitation of text-based searches. It is unfortunate that such a marvelous opportunity is dramatically diminished by the inability to exclude unrelated information. And the searching experience is, all too often, contaminated with unwanted material.

Parents, understandably, have serious concerns about their children's Internet surfing experience. Few solutions are available that effectively restrict access to inappropriate websites. There have been many heated debates about freedom of speech and inappropriate websites, which are easily accessible to children. Governments have great difficulty enforcing any constraints on website materials or how these sites restrict or prevent access by children.

U.S. Pat. No. 6,868,525 to Szabo, issued Mar. 15, 2005 discusses much of the same background to this searching problem as follows. The Internet presents a vast relatively unstructured repository for information, leading to a need for Internet search engines and access portals based on Internet navigation. The Internet's very popularity is based on its "universal" access, low access and information distribution costs, and suitability for conducting commercial transactions. However, this popularity, in conjunction with the non-standardized methods of presenting data and fantastic growth rate, have made locating desired information and navigation through the vast space difficult. Thus, improvements in human consumer interfaces for relatively unstructured data sets are desirable, wherein subjective improvements and wholesale adoption of new paradigms may both be valuable, including improved methods for searching and navigating the Internet.

Generally speaking, search engines for the World Wide Web (WWW, or simply "Web") aid users in locating resources among the estimated present one billion addressable sites on the Web. Search engines for the web generally employ a type of computer software called a "spider" to scan a proprietary database that is a subset of the resources available on the Web. All the search engines and metasearch engines, which are servers, operate with the aid of a browser, which are clients, and deliver to the client a dynamically generated web page which includes a list of hyperlinked universal resource locators (URLs) for directly accessing the referenced documents themselves by the web browser.

A Uniform Resource Identifier (URI) is the name for the standard generic object in the World Wide Web. Internet space is inhabited by many points of content. A URI is the way you identify any of those points of content, whether it be a page of text, a video or sound clip, a still or animated image, or a program. The most common form of URI is the Web page address, which is a particular form or subset of URI called a URL. A URI typically describes: the mechanism used to access the resource; the specific computer that the resource is housed in; and the specific name of the resource (a file name) on the computer.

The structure of the World Wide Web includes multiple servers at distinct nodes of the Internet, each of which hosts a web server which transmits a web page in hypertext markup language (HTML) or extensible markup language (XML) (or a similar scheme) using the hypertext transport protocol (http). Each web page may include embedded hypertext linkages, which direct the client browser to other web pages, which may be hosted within any server on the network. A domain name server translates a top-level domain (TLD) name into an Internet protocol (IP) address, which identifies the appropriate server. Thus, Internet web resources, which are typically the aforementioned web pages, are thus typically referenced with a URL, which provides the TLD or IP address of the server, as well a hierarchal address for defining a resource of the server, e.g., a directory path on a server system.

A hypermedia collection may be represented by a directed graph having nodes that represent resources and arcs that represent embedded links between resources. Typically, a user interface, such as a browser, is utilized to access hyperlinked information resources. The user interface displays information "pages" or segments and provides a mechanism by which that user may follow the embedded hyperlinks. Many user interfaces allow selection of hyperlinked information via a pointing device, such as a mouse. Once selected, the system retrieves the information resource corresponding to the embedded hyperlink.

One approach to assisting users in locating information of interest within a collection is to add structure to the collection. For example, information is often sorted and classified so that a large portion of the collection need not be searched. However, this type of structure often requires some familiarity with the classification system, to avoid elimination of relevant resources by improperly limiting the search to a particular classification or group of classifications. Another approach used to locate information of interest to a user, is to couple resources through cross-referencing. Conventional cross-referencing of publications using citations provides the user enough information to retrieve a related publication, such as the author, tide of publication, date of publication, and the like. However, the retrieval process is often time-consuming and cumbersome. A more convenient, automated method of cross-referencing related documents utilizes hypertext or hyperlinks. Hyperlink systems allow authors or editors to embed links within their resources to other portions of those resources or to related resources in one or more collections that may be locally accessed, or remotely accessed via a network. Users of hypermedia systems can then browse through the resources by following the various links embedded by the authors or editors. These systems greatly simplify the task of locating and retrieving the documents when compared to a traditional citation, since the hyperlink is usually transparent to the user. Once selected, the system utilizes the embedded hyperlink to retrieve the associated resource and present it to the user, typically in a matter of seconds. The retrieved resource may contain additional hyperlinks to other related information that can be retrieved in a similar manner.

A well-recognized problem with existing search engines is the tendency to return hits for a query that are so incredibly numerous, sometimes in the hundreds, thousands, or even millions, that it is impractical for users to wade through them and find relevant results. Many users, probably the majority, would say that the existing technology returns far too much "garbage" in relation to pertinent results. This has lead to the desire among many users for an improved search engine, and in particular an improved Internet search engine.

In response the garbage problem, search engines have sought to develop unique proprietary approaches to gauging the relevance of results in relation to a user's query. Such technologies employ algorithms for either limiting the records returned in the selection process (the search) and/or by sorting selected results from the database according to a rank or weighting, which may be predetermined or computed on the fly. The known techniques include counting the frequency or proximity of keywords, measuring the frequency of user visits to a site or the persistence of users on that site, using human librarians to estimate the value of a site and to quantify or rank it, measuring the extent to which the site is linked to other sites through ties called "hyperlinks" (see, Google.com and Clever.com), measuring how much economic investment is going into a site (Thunderstone.com), taking polls of users, or even ranking relevance in certain cases according to advertiser's willingness to bid the highest price for good position within ranked lists. As a result of relevance testing procedures, many search engines return hits in presumed rank order or relevance, and some place a percentage next to each hit which is said to represent the probability that the hit is relevant to the query, with the hits arranged in descending percentage order.

However, despite the apparent sophistication of many of the relevance testing techniques employed, the results typically fall short of the promise. Thus, there remains a need for a search engine for uncontrolled databases that provides to the user results, which accurately correspond the desired information sought.

Therefore, the art requires improved searching strategies and tools to provide increased efficiency in locating a user's desired content, while preventing dilution of the best records with those that are redundant, off-topic or irrelevant, or directed to a different audience.

As the amount of information available to a computer user increases, the problem of coherently presenting the range of available information to the computer user in a manner which allows the user to comprehend the overall scope of the available information becomes more significant. Furthermore, coherent presentation of the relationship between a chosen data unit of the available information to the rest of the available information also becomes more significant with the increase of information available to the user. Most of the existing methods utilize lists (e.g., fundamentally formatted character-based output), not graphic models, to indicate the structure of the available information. The main problem associated with the use of lists is the difficulty of indicating the size and complexity of the database containing the available information. In addition, because the lists are presented in a two-dimensional format, the manner of indicating the relationship between various data units of the available information is restricted to the two-dimensional space. Furthermore, because presentation of the lists normally requires a significant part of the screen, the user is forced to reduce the amount of screen occupied by the list when textual and visual information contained in the database is sought to be viewed. When this occurs, the user's current "position" relative to other data units of the available information is lost. Subsequently, when the user desires to reposition to some other data unit (topic), the screen space occupied by the lists must be enlarged. The repeated sequence of adjusting the screen space occupied by the lists tends to distract the user, thereby reducing productivity.

A users' knowledge of the subject represented in the hypermedia is a particularly important user feature for adaptive hypermedia systems. Many adaptive presentation techniques rely on a model of the users' knowledge of the subject area as basis for adaptation. This means that an adaptive hypermedia system that relies on an estimate of the users' knowledge should update the user model when the user has presumably learned new things. Further, a preferred user model according to the present invention preferably also models decay of memory.

There are two common ways of representing users' knowledge in an adaptive hypermedia system. The most often used model is the overlay model that divides the hypermedia universe into different subject domains. For each subject domain in the hypermedia universe, the user's knowledge is specified in some way. The user's knowledge of a particular subject domain can be given the value known or unknown, or for instance a fuzzy semantic variable such as good, average or poor. On the other hand, a numeric or continuous metric may be provided. The user's knowledge may also be represented as a value of the probability that the user knows the subject. An overlay model of the user's knowledge can then be represented as a set of concept-value pairs, one pair for each subject.

The other approach, apart from the overlay model, is the stereotype user model, in which every user is classified as one of a number of stereotypes concerning a particular subject or area. There can be several subareas or subjects, so one user can be classified as a different stereotype for different subjects. For instance, a novice stereotype, an intermediate stereotype and an expert stereotype can be defined for one subject in a system, and every user is therefore classified as one of an expert, novice or intermediate on that particular subject. This scheme is much simpler to implement but caries the disadvantage of not being able to tailor the appearance of the system to every individual user.

In some adaptive hypermedia systems, the user's background is considered relevant. The user's background means all information related to the user's previous experience, generally excluding the subject of the hypermedia system, although this exclusion is not necessary in all cases. This background includes the user's profession, experience of work in related areas and also the user's point of view and perspective.

The user's experience in the given hypermedia system means how familiar the user is with the appearance and structure of the hyperspace, and how easy the user can navigate in it. The user may have used the system before, but does not have deep knowledge of the subject. On the other hand, the user can know a lot about the subject, but have little experience of the hypermedia system. Therefore it is wise to distinguish between the user's knowledge and the user's experience, since optimal adaptations for each factor may differ.

The user's preferences are used in adaptive information retrieval systems mostly where they are the only stored data in the user model. Users' preferences are considered special among user modeling components, since they cannot be deduced by the system itself. The user has to inform the system directly, or by giving simple feedback to the system's actions. This suggests that users' preferences are more useful in adaptable systems than in adaptive systems. However, users' preferences can be used by adaptive hypermedia systems as well. Some researchers have found that adaptive hypermedia systems can generalize the user's preferences and apply them on new contexts. Preferences are often stored as numeric values in the user profile, contrary to the case for other data, which is often represented symbolically. This makes it possible to combine several users' preferences, in order to formulate group user models. Group models are useful when creating a starting model for a new user, where this user can define his or her preferences, and then a user model is created based on the user models of other users who are in the same "preference group".

Machine learning and use of intelligent agents is a useful technique, with respect to adapting the user interface to different users' needs. The reason for this is that the same user can have different needs at different times and therefore the system must respond to the user, and examine the user's actions, in order to understand what the user needs. In other systems that use user modeling, for instance, in film recommending systems, the system already knows what the user wants and the interaction with the user is not as important.

DISCLOSURE OF THE INVENTION

A system for information retrieval from a collection of hypermedia data over a distributed network, such as the Internet of a private LAN or WAN is presented. Hypermedia data includes every kind of URI and URL, including hyperlinks to the URIs and URLs. The system includes at least one computer server hosting an information retrieval site and the computer is operatively connected to the distributed network. A data storage system residing on computer readable media is operatively connected to the computer server, and the data storage is preferably a collection of hypermedia data. The data storage can advantageously be in the form of a database with records that contain fields having hyperlinks to particular URLs and URIs on the Internet, as well as fields containing various portions of categorization and subject matter code and fields for user preferences and user flagging of records. In the collection of hypermedia data with its hyperlinks to items of actual hypermedia content (for instance, the content out on the Web), the hyperlinks are each respectively associated with at least one code value generated based on the content of the respective pointed-to hypermedia content. This code value is stored for instance, in a typical database example, in one or more fields in the record containing the hyperlink. Alternatively, in other databases, the code and hyperlink do not have to occupy the same record, but only be operatively associated, as will be appreciated by those skilled in the art.

The system also includes an input/output device, such as a computer connected to the Internet, through which a searcher accesses the information retrieval site and inputs retrieval data and receives selected output. An application runs on the computer server, and the application receives progressive user input and iteratively builds a user search code value according to the user input (see further discussion in relation to FIG. 5 infra). The application also matches the user search code value to at least a portion of the hypermedia content code value for the hyperlinks in the data storage to identify each such associated hyperlink to a particular information retrieval data set. Some of the matches may be selectively partial, so that a retrieval set broader than the user generated search code may optionally be returned. When all possible matches of user generated search code value with hypermedia content code value are accomplished and the hyperlinks associated with the matched codes are identified or flagged appropriately, all such identified or flagged hyperlinks, together with optionally selected other related data from the data storage, are displayed as the particular information retrieval data set to the user.

The system application may also optionally be adapted to display to the user selected non-text information retrieval input options, such as photographs or other pictographic displays, and the information retrieval data set optionally returns to the user at least in part as non-text Uniform Resource Identifier hyperlinks.

The system application optionally iteratively builds a user search code value by presenting to the user selected information retrieval options organized into a hierarchy. The hierarchy advantageously includes levels of hierarchical groupings, and the hierarchical groupings each represent sets of hypermedia content. The sets of content are generally less than the entirety of the hypermedia content represented by the hypermedia data in the data storage system. Each level of hierarchical groupings has an assigned portion of the user search code value and each hierarchical grouping has a value to be assigned to the portion of code. The application then receives input from the user in the form of the user selecting a hierarchical grouping, and uses the grouping selection to assign the hierarchical grouping's code portion value to the hierarchical level's assigned portion of the user search code value.

The system application also optionally presents search options to the user organized into a plurality of search axes, each axis having an assigned portion of the user search code value, and each axis having nodes of intersection with the other axes. Each such axis has at least one hierarchy, and the hierarchy has levels of hierarchical groupings, with the hierarchical groupings representing sets of hypermedia content. The application presents nodes of intersection of the axes to users at each level of a hierarchy, allowing for selection of additional search options by users from a selected axis. The application also advantageously receives input from the user as to which axis is selected and uses the selection to generate the axis' assigned portion of the user search code value.

The system application optionally also creates further entries of hypermedia data into the collection of hypermedia data, and each further entry includes a hyperlink to an item of hypermedia content, where the hyperlink is associated with at least one hypermedia content code value.

A method for information retrieval from a collection of hypermedia data over a distributed network is also presented. The method steps include a. analyzing items of hypermedia content from a source of hypermedia content and building for each item a hypermedia content code value;

b. associating both the hypermedia content code value for each item and a hyperlink for each item into the collection of hypermedia data;

c. using progressive user input to iteratively build a user search code value according to the user input;

d. at least partially matching to the user search code value at least a portion of at least one hypermedia content code value to identify to a particular information retrieval data set each hyperlink associated with the matched code;

e. displaying the particular information retrieval data set to the user.

The method optionally includes in step c, displaying to the user selected non-text information retrieval input options, and in step d returning to the user the information retrieval data set at least in part as non-text Uniform Resource Identifier hyperlinks.

Also presented is a data storage system having a collection of hypermedia data, where the collection includes hyperlinks to items of hypermedia content. The hyperlinks are each associated with at least one respective hypermedia content code value, and each code value is based on selected categorizing criteria for the hypermedia content to which the respective hyperlink is pointing. While at present it appears to be most expedient to generate a data storage that is not the Internet or Web, but in which hypermedia data related to the hypermedia content of the Web is collected for access, it is contemplated that as the power of content coding for user code making access to targeted data becomes evident, many webmasters will want to start including such content code fields in their websites. If this code field inclusion is done in a standardized way, it becomes optional to do content targeted retrieval directly from the Internet, any of which is contemplated as included in the disclosed method and system.

A new means of retrieving data from the Internet, or any other network such as a LAN, and all generally referred to herein as "internet" or "Web", using visual comprehension, rather than textual conceptualization, is thus disclosed. It addresses the problem of language ambiguity and the current implicit search requirement that a user have adequate vocabulary as well as an aptitude for computer logic. Also, the conventional method assumes that nothing fits the subject matter unless a word is found that potentially matches the subject matter; the disclosed method generally assumes that everything is relevant until words are found that indicate the subject matter is not in sync with the objective. For example, a search for environmental issues regarding the well being of swordfish should not return results that include a restaurant, which is offering swordfish for dinner.

A method and system for information retrieval driven by mouse clicks on representational images is presented. In a user front end, images are used as guide markers for drilling into sequential result levels. Where the drilling stops, a specific code is generated which represents only the subject at the end of the drilling. Meanwhile, in a back end that is transparent to the user, an indexed database is built by associating corresponding codes with each Internet website. When the user generated code is then matched in the database to a corresponding code, the server provides the user the appropriate subject matter results that are matched to that specific code. The user thus obtains faster and more effective, more relevant searches. At the same time, the user avoids much unwanted material.

Problems inherent in language-based searches are thus addressed in the following ways: images are easy to comprehend universally; images are more precise in meaning; no keystrokes are needed, eliminating mistaken results; minimal ambiguity about images; spelling errors are eliminated; no need to remember words and names; no need to be able to read; and indexing and codes provide options for parental controls The searcher uses a mouse to click on icons, preferably photographs, to facilitate expedited representational drilling into the vast data of the Internet. Visual recognition of images avoids the need to read any text, which increases ease and speed. Obviously, the human brain's ability to identify photographs is particularly rapid, as expressed in the familiar cliche: "a picture is worth a thousand words."

Programmatic and custom indexing of the Internet dovetails into this searching method by coding a large portion, if not all of, the Internet by content and not merely by words. In this way, the results from image searching conclude by matching user search objectives to available Web content. In other words, there is an elevated level of probability that search results are on target.

Also presented is an alternative approach to subject matter selection criteria other than using a conventional text match up system. The disclosed method tends toward being exclusionary rather than the conventional inclusion method, presenting only those sites conforming to subject-matter requirements rather than just text-match.

The database indexing includes additional data fields for subject matter coding. These data fields define selection criteria, for instance: Subject Matter, Geographic Location, Date and File Extension. Websites containing multiple subject matter, geography, or dates, may thus readily have multiple representations within these same fields.

The process of indexing is preferably automated. Automated indexing is based on principles of inclusion together with exclusion. These use selective/exclusive vocabulary that is based on subject matter and specific attributes, rather than just text.

Areas appropriate for index automation (non-exhaustively listed) are the presence/absence of: subject matter, images, key words, audio, video, tables, popup ads, viruses, pornography, hijack software, animation programs, and certain file extensions.

User search options define the acceptance of these elements and the priority of search results. Additional index automation may optionally be accomplished using complex strings of Boolean commands. Indexing with these secondary parameters purges the potential search results from being unsatisfactory or offensive. Index automation techniques later developed are contemplated to be included as well.

The database desirably includes three, or more, fields that define certain "axes" of inquiry. Each of these fields contains, or is adapted to contain, a specific alphanumerical (or just letters or just numbers) code that corresponds to various subject matter criteria. There are also optionally extra fields for priority values, which are capable of user definition. Still further fields contain image thumbnails as found on each web page.

The frequency of user selection optionally progressively builds a popularity value in one of the priority value fields. This priority value shuffles the results to mirror the user's preferences. Search results may also be prioritized, based on the number of images available on result pages.

Thumbnails are optionally presented in search results. Web pages that include many image extensions may be selectably assigned priority over other sites containing a lower number of image files. Search results are optionally presented with a number of thumbnails of images found on that linked page. Optionally a small amount of text from that web page, including the page title, is presented. These search result thumbnails provide a visual glimpse into each potential site before actual selection is made, thereby increasing the probability of appropriate selection. Once again, the images give the user a faster and generally more reliable way to interpret the search results.

The web user may control the selection parameters through a dedicated options control panel. For instance, each file extension found on websites, may optionally be selected to have a priority value, which determines presentation order. The user may also turn off the selection priorities altogether and apply another selection criteria such as a word, or series of words.

One form of preferred data storage is a database, that optionally has a field in each record that contains the number of web links that are resident within and below that level. An optional CD key (see further discussion in Best Mode section) accesses that information from the database and presents the dynamic value in the user's browser. The total of all links presented for the next selection then equals 100%. The percentage distribution is shown for each link. These dynamic values are presented visually with a bar graph or just as numbers.

Users thus have the ability to quickly find information by an easy-to-use drill down with easily identified images that define a subject matter. The hierarchy of the drill down provides a clear path for the user to follow to their destination. At any user selected location or point in the drill down hierarchy, the user may selectably submit this location (which is to say submit the hidden code value that has been generated by the user drill down choices) to the matching function of the information site's computer application (sometimes referred to herein as a 'search engine'), which will deliver all records matching that intersection of the hierarchy (i.e. which match, or partially match to a selectable degree, the user search code value).

A collection of hypermedia data, such as a database (and sometimes herein referred to generically as a 'database') is advantageously created as follows: all database records are initially included in each main subject matter; a series of update queries (sometimes also referred to herein as scrubbers or labelers) then proceed to remove all pages that are NOT relevant to that main subject matter. "Removal" is generally not physical, though selectably it can be; rather "removal" is advantageously accomplished by assigning to the page to be 'removed' a code value that takes that page out of selected subject matter inquiries, thus effectively and virtually removing the page from a database devoted to any of those subject matters.

For the next step, it is assumed that all of the remaining pages belong to each of the subset categories. All of the pages NOT relevant to the next level are systematically removed. This way, only the pages that have not been removed will be remaining. These are the pages that have survived every sequential cut along the way. This is like the old adage: "How do you carve an elephant?" The answer: you remove everything that does not look like an elephant.

As discussed above, a web page is not removed, per se, but rather given a low ranking value, which just indicates that the web page is not narrowly focused. Thus, if a user has reached a narrow point along the front end GUI drill down and then searches using particular words within the search result set, a low ranking site could still surface because of a correspondence of a specific element with the particular word. For example, there could be video files within the lower ranking sites that cater to multiple subcategories, which would not normal surface. But the more specific sites might not include the specific words or other content.

The term low ranking is not to say that it is a numerically lower value but rather that it has a subject matter code that would normally place it lower within some kinds of search results. Some pages might so cover multiple areas that they surface amongst the sites that are more focused along a specific subject matter. The user has the option to allow these "general" sites to be part of a search return list or the user may choose to only see sites that share the same narrow, and detailed, focus.

A front end drill down system comprised of HTML pages that are relatively static in design and dynamic in some of the content is presented. Each page has photographs, or images, that vary as they are populated from a looping system drawing from a database table. These pages are cross-linked to provide the user with a hierarchical path to navigate towards ever increasing degrees of precision.

For example only, suppose there are 5 main categories in the drill down structure: Space, Earth, Living, Social, and Science.

Under each of these main categories there desirably are only 5 to 10 sub categories. Using this example, after just five selections, the full body of data has been reduced by approximately 99.998 percent (assuming that at each intersection there are (on average) 10 selections.

$$1/(5 \times 10 \times 10 \times 10 \times 10) = 1/50,000 = 0.002 \text{ percent.}$$

Alternative illustration: prior to a selection, there is 100% distributed amongst five selections. The user makes the first selection and the data is reduced to 20%. The second selection has 10 choices, this reduces the data to 2%. The third selection from 10 choices reduces the data to 0.2%. The forth choice reduces the data to 0.02%. And finally, the fifth choice reduces the data to just 0.002%. (By no means is there a limit to only five sub levels, nor a limit of 10 selections per page.)

If we consider starting with a billion pages to begin with, then (1,000,000,000) times 0.002=20,000 pages. From this relatively small selection, the data can be sorted on other parameters thereby further reducing the result set. These parameters could be, for example only, the presence of particular file extensions such as video or jpeg. Alternatively, the user can search within this tight result set for various values and/or other terms.

From this refined or attenuated point, the remainder is queried for the finest level of detailed information. This further refinement is advantageously accomplished by sorting by file type or a word. Since the user is already in the narrow area of interest, the next step will likely deliver the highest possible relevance.

The possible drill down HTML pages will number in the tens of thousands but will be generated using a program such as PHP. This provides a dynamic set of variables. Even the images associated with the drill down will be catalogued along the same lines as the database. Therefore, the pages are constructed dynamically as the user travels through the database.

The front end photos each have their own catalogue as well as a name. As the pages are built, the photos optionally appear with their name. The name associated with each photo is optionally available in a plurality of languages. The user selects their language of choice at the onset, or on the home page, or optionally at any point, and the choice point is advantageously switchable. Since the photos are self-explanatory, there is no real dependency for the words to convey the meaning. This feature allows someone to use the drill down as a way to expand their vocabulary in a multitude of languages.

In a case where the user selects inquiries from three axes, the user could choose subject matter, then geography, and finally time. By using these three axes the user has eliminated any record that does not conform to all three axes of inquiry.

| | | | |
|---|---|---|---|
| War | Germany | 1942 | Result = Second World War |
| Space | Mars | 2005 | Result = Mars Rover landing on mars |
| Reptiles | Galapagos | | Result = Tortoise and Lizards |
| Mammals | Galapagos | 1400 | Result = seals |
| Mammals | Galapagos | 2006 | Result = seals, goats, cows, horses |

The drill down front end preferably includes a number of components as follows: a database of images representing specific subject matter, and the images are all catalogued based upon this subject matter; a dynamic page application, or programming language, such as PHP; a database of subject matter words/labels in multiple languages, which are each given a subject matter code value; as the user makes a selection for the next hierarchical level of the front end, the database populates a dynamic page with values from the front end database; these values are all a subset of the previous page; the server application delivers this dynamic content to the HTML editor/compiler to produce the pages representing each stage of the drill down.

The code value for each node then is a compilation of the steps to reach that node. For example, Animal=1, Vertebrate=1, 2, Mammal=1, 2, 5, Primate=1, 2, 5, 8. Chimpanzee=1, 2, 5, 8, 4. In this way, when the query is sent to the database, from the Chimpanzee front end display page, only records populated with the 12584 code value are available for viewing. This multi-step approach dramatically reduces the possible result set through the exclusion of all records that do not have that value. As the user proceeds down the path, each subsequent selection made by the user further restricts/refines the available database results by 30 to 95 percent, depending upon the number of options and the distribution of records across those selection possibilities.

The user has the option to use multiple axes concurrently. For example the user may also be interested in geographical factors, or time periods, or some other variable. By combining multiple axes the refinement of the subject matter is intensified. For example, say the user is only interested in finding reports about gibbons located in Thailand during the 1950. The first selection uses the animal hierarchy to select only gibbons from the database. Next the user selects Asia from a map of the world, and then Thailand. For the last step, the user selects from a time line for the period of 1950s. At this point, with just clicks of the mouse, the user has reduced the possible data set from billions to only a hand full of records and these are exactly what the user is looking for.

Thus a user is provided with a means for Internet exploration. There is no need to have a starting search term. The user starts at the root of information hierarchies and proceeds to navigate using intuitive images that leads through progressive levels or divisions of the subject matter.

The user explores areas of information, which is structured along logical pathways representing hierarchical relationships of subject matter. The user's sequential selections provide a clear and unambiguous understanding of the user's intent or objective.

Users may thus explore areas of knowledge which are completely unknown to them. Vocabulary is not required at all. Thus a three-year-old will feel comfortable and explore unhindered by their lack of vocabulary or knowledge of information architecture. Furthermore, this invention provides a superb benefit for those wishing to learn new words and new subject matter.

A method of adding a value to each record in the database is also provided. This value defines the position of the record in the hierarchical structure. The value is built through a series of steps. First the records are reviewed for the presence of words that are assembled in a "population table" These words are chosen as generic words that are found in a specific subject matter. Using this criteria, the database table is populated with "raw" records (or search results). Next, a "scrubber" applies a series of words from a "scrubber table" to remove records that should not be included. These words are included in the scrubber table based upon the probability that they would NOT be found in this particular subject matter. For example, in the subject matter of animals, the word football is most likely not appropriate. After the scrubber is finished removing the unrelated records, the next step begins. This final step adds further definition to the hypermedia content code value for each record. If the record has a high degree of focus or specificity, then the classification value represents this. If the record is more generic, then the classification value is "closer" to the root of the main subject matter.

For example, a database is first populated with millions of records where the vocabulary for animals finds records with matching vocabulary. Next a scrubber uses its exclusionary vocabulary to remove all records which contain words from the scrubber vocabulary. Finally, the hypermedia content code value for each record is refined to reflect the level of detail or focus that the record shows.

In the end, this hypermedia content code value is matched to the front end drill down so that when a user reaches a specific node in the drill down interface, the user sends a pre-built query (unseen and transparent to the user) to the database to retrieve all records that match the parameters (code matching) of that node in the drill down.

The database records are returned to the user who may then selectably further sort the records based upon the presence of various file types or language structure of the records. For example Latin names of animals or long words could indicate a more sophisticated record. Alternatively, if the record has a serious percentage of short words it would likely indicate a record suitable for a child.

The back end hypermedia content coding of the database records is as follows: adding at least one critical field to the database records for this code; this field is populated with automatically generated (and updated) values; these code values are based upon a series of database queries, which refines the value; the refining queries generally work on a principle of exclusion rather than inclusion; step one is to include all records that qualify based upon a given search parameter; step two is to eliminate all records from that subset that do NOT qualify; a selectably complex string of vocabulary is used for this exclusion process.

For example, database values for the mammal dolphin (including spelling for all languages). Step one "select all records that have the world dolphin"; step two "remove all records that have the following words [a, b, c, . . . ]. The possible vocabulary for step two could include: Sports, Miami Dolphins, football, restaurant, hotel, motel, t-shirts, etc.

For each node, or intersection of the selected search axes or change in level in the hierarchy, there are words that can be used to find records, and other words that can be used to exclude records. By running these two complex queries back to back, the value for each record can be automatically update. This value thus corresponds to a node within the front end display.

BEST MODE OF CARRYING OUT THE INVENTION

Figure 1:
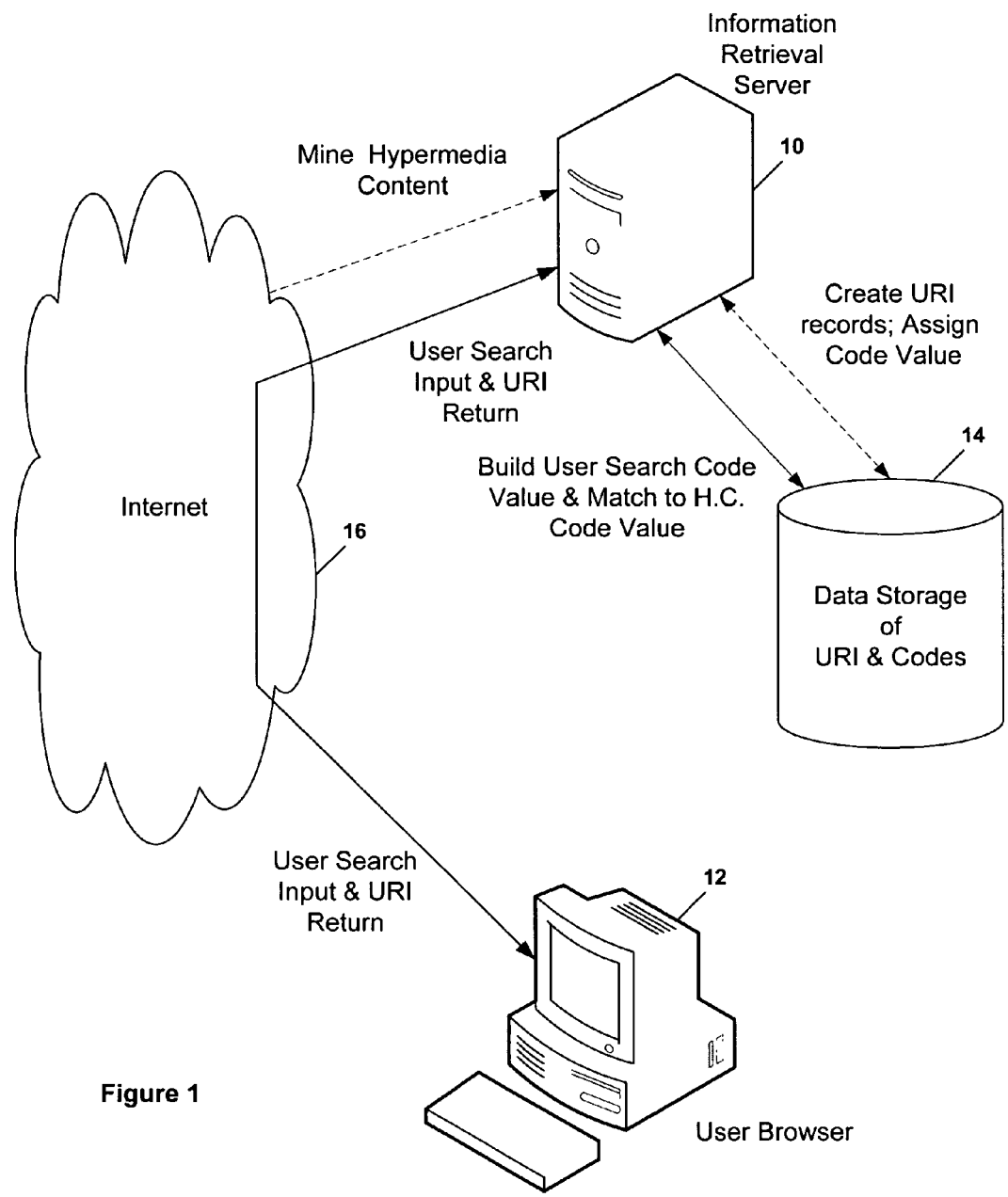
FIG. 1 is a diagram of a preferred embodiment of the disclosed system.

As discussed in the section titled, "Background of the Invention", Uniform resource identifiers (URI) provide a way of identifying the many points of hypermedia content residing on a distributed network, such as the Internet. For the purposes of this application, the term "hypermedia content" refers to any entity accessible through or downloadable from a distributed network, whether it be a page of text, a video or sound clip, a still or animated image, an application program or any other entity now known or later developed.

In the context of this application, a "hierarchical grouping" represents a subset of a larger set of hypermedia content. At a hierarchical level a user is presented with a plurality of hierarchical groupings representing a further division of the hierarchical level. Should the user select one of the groupings, the next hierarchical level displayed will be a collection of hierarchical groupings that represent a further division of the hierarchical grouping just selected. Thus hierarchical groupings provide a means of continually paring down a body of hypermedia content through successive selections of search criteria.

A "search axis" is another and simultaneous categorization of the hypermedia content. The concept of "search axes" expand the possibility of hypermedia categorization beyond a two dimensional hierarchical tree into n-dimensions. A single piece of hypermedia content may appear on the hierarchical trees of a plurality of search axes. For example, a webpage discussing the evolution of dog grooming during the 1950s in Europe may be reached through Europe on the axis of geography, 1950-1959 on the axis of time and dogs on the axis of animals. It will not be returned in a search, however, on the axes of religion, science or philosophy. It is useful to note that an axis in the sense intended in this application is not a single line, or even a straight line; it is more a thrust or a direction of inquiry, and within each such selected axis, there are possible many hierarchical branchings of content, as discussed infra.

"Nodes", in the context of this application, are those points where axes intersect. The webpage used as an example in the preceding paragraph would be returned from one of the nodes (there can be more than one) where the axes of geography, time and animals intersect. A "node" for purposes of this application can also be any hierarchical branching point, since such a branching point is also a point where a different axis may be selected.

The following discussions of the drawings will further illuminate the definitions of terms discussed above. Turning now to the drawings, the invention will be described in a preferred embodiment by reference to the numerals of the drawing figures wherein like numbers indicate like parts.

FIG. 1 is a component diagram of an embodiment of the disclosed system. A back end or support structure for the system resides on a computer serving as an information retrieval server 10 with access to the Internet 16 and to a data storage means 14, such as a database. Back-end processes are indicated in FIG. 1 by arrows with dotted lines. An application residing on Server 10 obtains data associated with hypermedia content on the Internet 16. It should be noted that, for the purposes of this application, the referenced hypermedia content may also reside on local area networks or any other distributed network.

The data includes uniform resource identifiers (hereafter URI). The method of obtaining data for the hypermedia content is through such direct means as spiders and data miners, indirect means such as third party subscription services or any other method for mining information from a data collection available over a distributed network now known or later developed. The application residing on information retrieval server 10 uses the data associated with hypermedia content to create a hypermedia content code value according to a labeling, scrubbing and/or flagging set of categorizing rules.

For instance, and simple as illustration and not as limitation, a simple alphabet coding may be based on first letter of categorizing words, such as Living, Animal, Amphibian, Mammal, Frog, or Wolf. As each content set is evaluated for coding, and for instance it is seen to cover living things, the letter L is assigned as a first letter of a code string; then it is seen to be about animals, so the letter A is assigned to the next place in the code string, and so on, until the content, which turns out to be a page about primate development, has been assigned a code string of LAVMP as a code value. In a similar vein, which is expected to be within the grasp of persons skilled in the art, numbers may be used instead, or mixtures of numbers and letters. The code value can contain more than one string, suitable for content categorizing across multiple axes, where each string is stored in a separate field associated with the hyperlink that points to the hypermedia content.

Once the application has created the hypermedia content code value to be associated with a set of hypermedia content data, the code value is stored in data storage medium 14 and linked to the URI which points to that set of hypermedia content. Also residing on information retrieval server 10 is a website accessible to the user through any means used to access the Internet 16, such as a personal computer 12 running a browser application. The server application is adapted to display search options to a user on the website, such as hierarchical grouping selections, to receive search selection input from the user and to use the user's selections to build a user search code value. The server application then matches the user search code value to the hypermedia content code value of data in the data storage, creating either a return set of URI or optionally a selected set of hierarchical groupings, which are adapted to constitute the next level of the user's search hierarchy.

Figure 2:
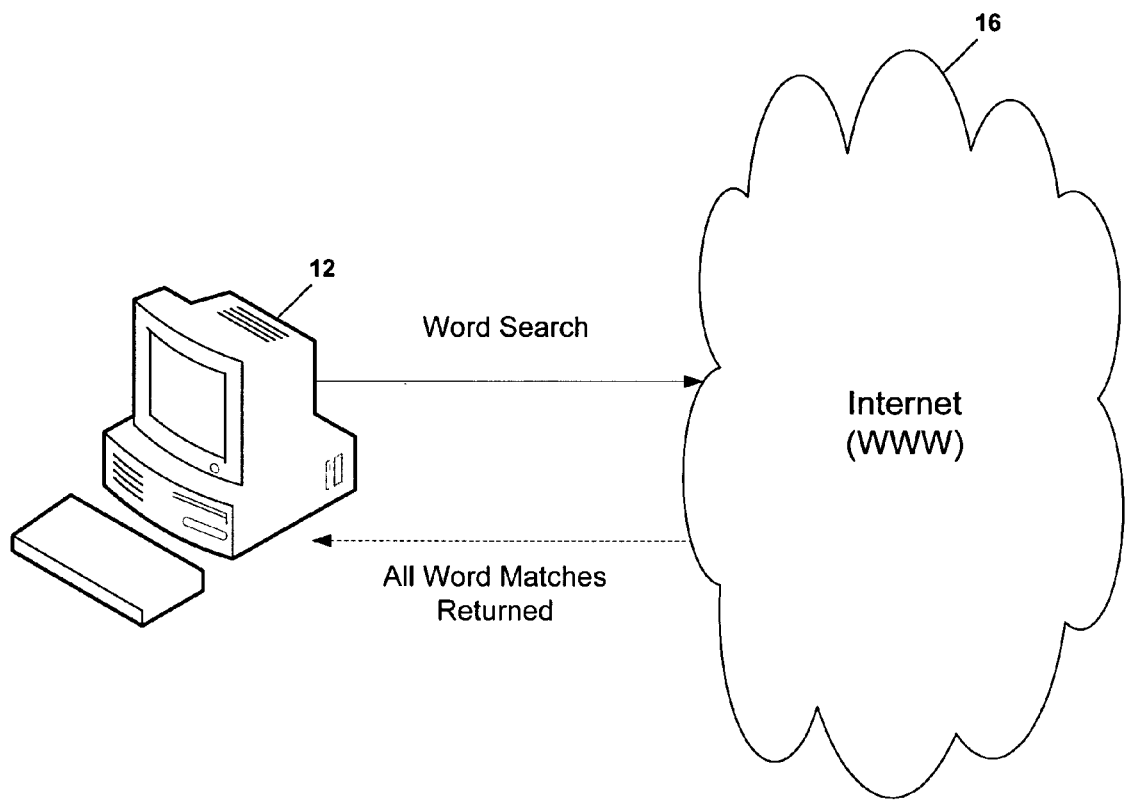
FIG. 2 is a diagram of a current system.

FIG. 2 illustrates the state of many search engines currently serving the Internet and World Wide Web 16. Such search methods perform "inclusive" searches. A user inputs a search request from their computer browser application 12 composed of textual alphanumeric "keywords". All data within the hypermedia content of the Internet/World Wide Web is organized as flat, having no structure nor hierarchy. Each URI or location is equal. Targets are found which include the selected words, regardless of the meaning of the words, with no provisions to restrict access to inappropriate websites. All URI pointing to hypermedia content with an alphanumeric match are therefore included in what the search returns. For example, if a user is searching for information pertaining to the protection of the dolphin as a species, entering the word "dolphin" into a currently commonly used search engine will return hyperlinks to the Miami Dolphins football team and websites containing recipes for dolphin steaks. It is then up to the user to sift through the returned hyperlinks, many of which will not be clear solely from the link as to what their content is, or to devise a keyword based search combined with logical exclusive operators to eliminate such matches.

Figure 3:
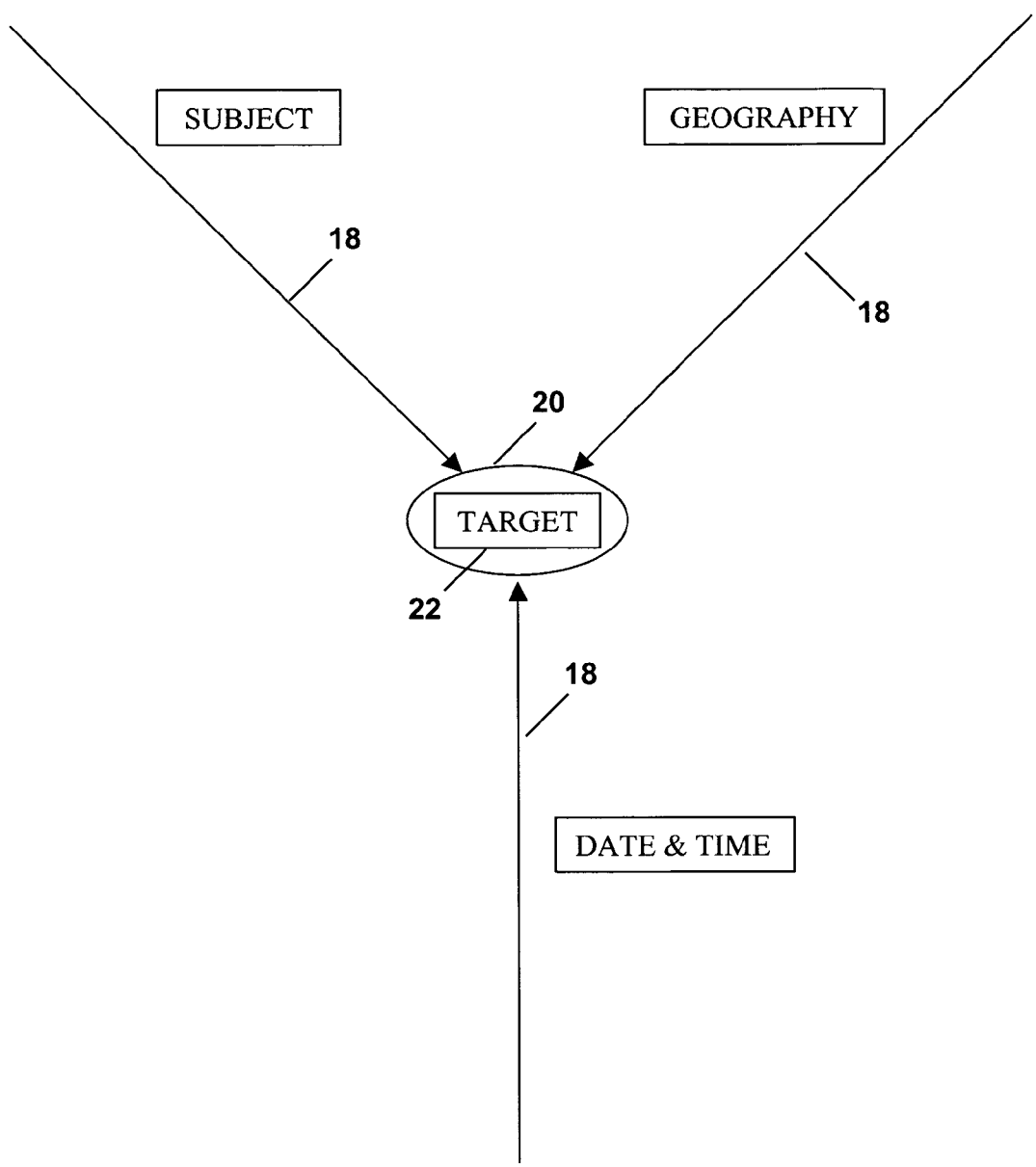
FIG. 3 is a diagram of a preferred embodiment of the disclosed system.

FIG. 3 illustrates the "exclusive" search system and method disclosed in this application. In this example, user pursues a search by making selections of search options along three axes 18 sequentially selecting hierarchical groupings according to a subject matter axis 18, geography axis 18 and a date and time axis 18. At the time the user requests a search return, all search selections are combined creating a narrowly defined intersection of axes 18, now defined as a node 20. The target set of URI 22 are the only returned hyperlinks that contain the hypermedia content as defined by the user's search process. For example, the user selects along the subject matter axis 18, first "Animals", then "Mammals" and "Dolphins", effectively eliminating any search returns from a "Sports" category. Then the user selects the geography axis 18, and along that selects the hierarchical groupings "Oceans" and along the date and time axis 18 the current date. Upon requesting a search return, the user is presented a graphical display of hyperlinks to a target set of URI 22 which point only to hypermedia content that apply to the mammal dolphin, as existing in the oceans of the world today. Irrelevant data is excluded based on subject matter compliance, not text or terminology that often has multiple meanings. Optionally, a user performs the sequential selection process selecting from images or sound representations, rather than text, thus eliminating the need for ambiguous words entirely.

Figure 4:
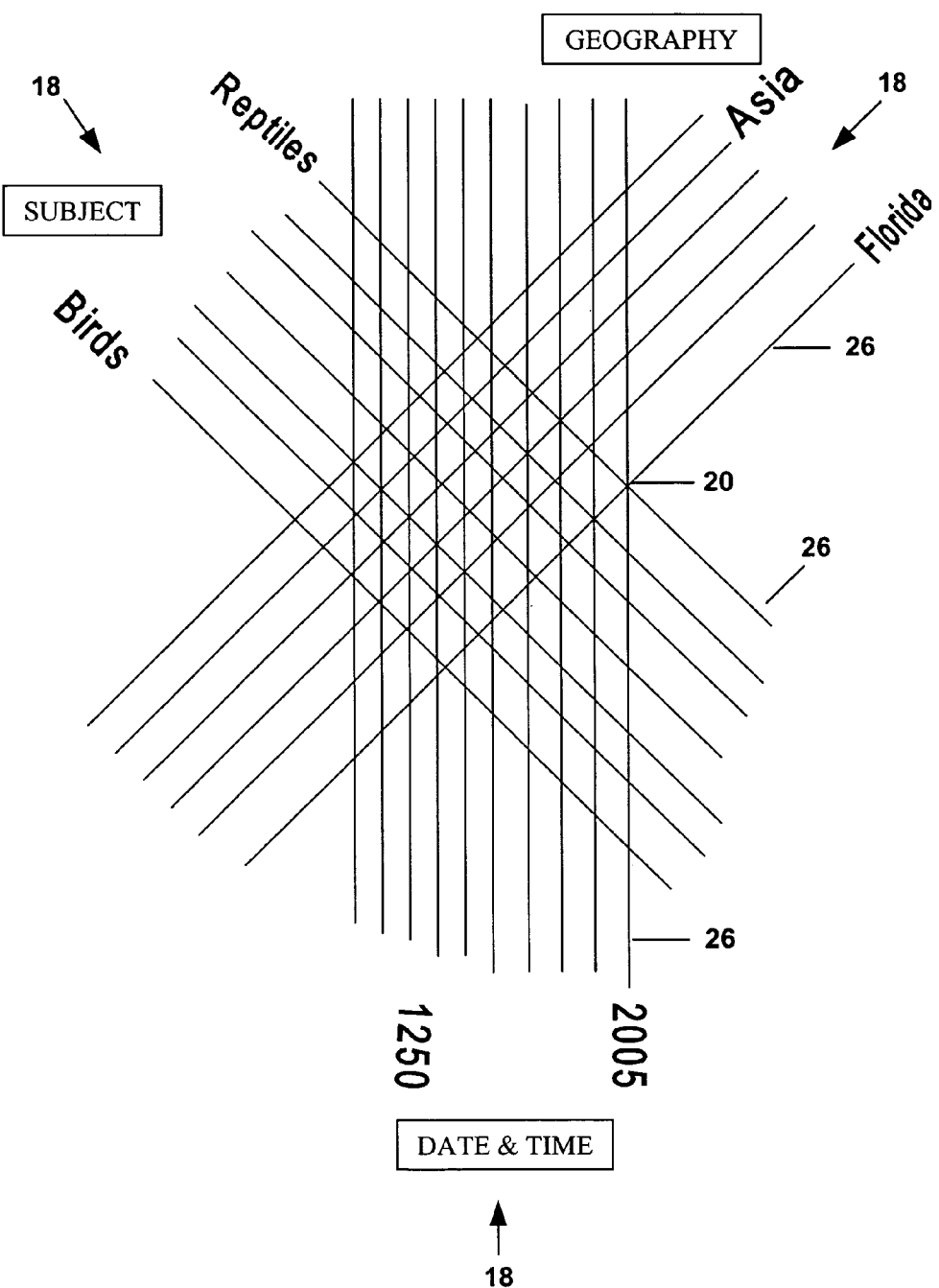
FIG. 4 is a diagram of a preferred embodiment of the disclosed system.

FIG. 4 illustrates hierarchical groupings 26 within Axes 18. As in FIG. 3, axes representing subject matter, geography and date and time are shown. It should be noted that any alternate categorizing concept may be used for an axis 18, such as humanities, history, cosmos, philosophy, sciences, fine arts, current events and fashion. In this drawing, it can be seen that on any hierarchical level, a number of hierarchical groupings are presented for search option selections. For example, within the subject matter axis 18 are hierarchical groupings 26 for mammals and birds. A node 20 is created at the intersection of one or more hierarchical groupings 26 within axes 18. A user selecting the Florida hierarchical grouping 26 from the geography axis 18, the reptiles hierarchical grouping 26 from the subject matter axis 18 and the year 2005 hierarchical grouping 26 from the date and time axis 18 is presented with hyperlinks to hypermedia content for alligators, geckos, water moccasin, python and crocodile. These are within a target set of URI that will be returned from node 20. No hyperlinks to hypermedia content would be returned for dinosaurs (wrong time), racoons (wrong subject) or komodo dragons (wrong geographic area).

Figure 5:
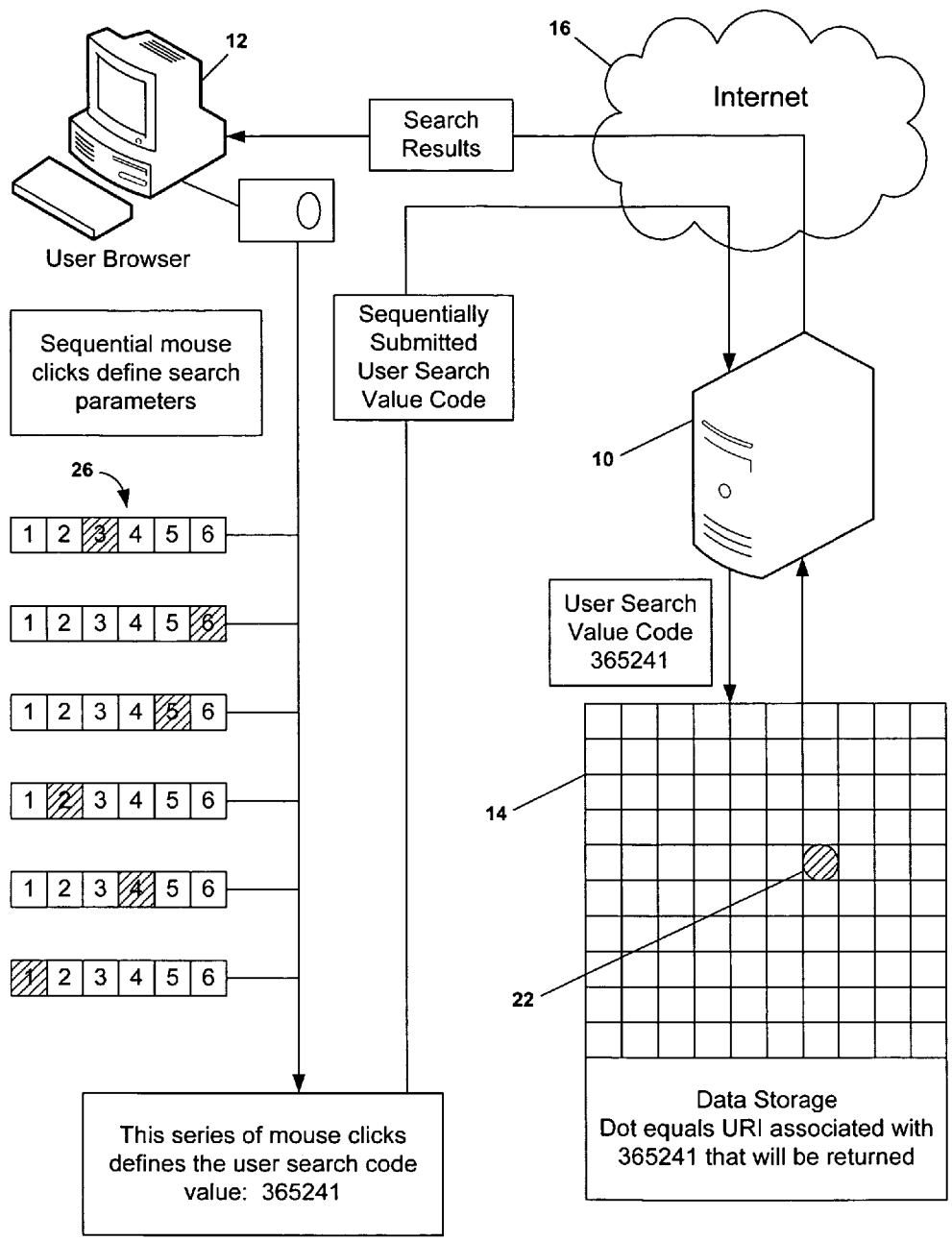
FIG. 5 is a diagram of a preferred embodiment of the disclosed system.

FIG. 5 illustrates the mechanism through which target hypermedia content is matched during a search process. Accessible to server 10 is data storage 14, containing hypermedia content data which includes URIs associated with the hypermedia content code values. A user accesses the server 10 application and website through the distributed network and selects search parameters through sequential mouse clicks. Advantageously, the user clicks an image display, but in the background, each click submits selection criteria which the server application uses to build a user search code value. In the example of FIG. 5, the user sequentially selects images that correspond to hierarchical groupings 26 assigned the values 3, 6, 5, 2, 4 and 1. The server application sequentially builds the user search code value 365241. This value is matched to hypermedia content data within data storage 14 that has a hypermedia content code value of 365241, resulting in a target set of URI 22, which is returned to the user through the Internet 16 as search results. The search results are advantageously displayed as hyperlinks which the user may use to navigate to the desired hypermedia content.

Figure 6:
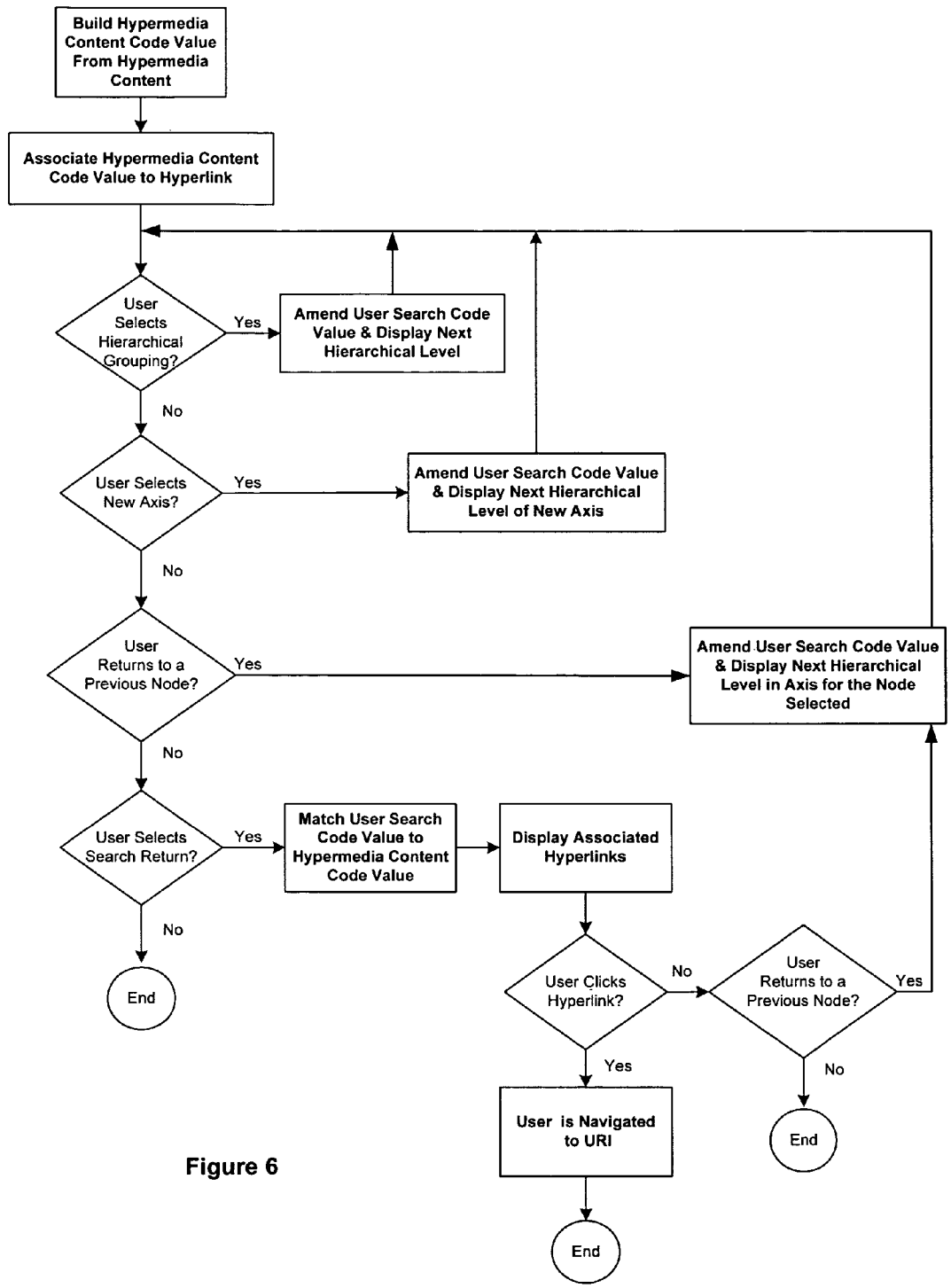
FIG. 6 is a flowchart of a process within the disclosed system.

FIG. 6 is a flowchart illustrating an embodiment of the disclosed method. Through one of the means discussed above in the section titled, "Disclosure of the Invention", hypermedia content is analyzed and a hypermedia content code value is created. The hypermedia content code value is associated in the data storage with a URI to be later used as a hyperlink for navigation to the material. In the method embodiment illustrated, a user chooses whether to begin a search through one or more decisions. Optionally, a user selects a hierarchical grouping from a root hierarchical level in a root axis.

This begins an iterative process where the user makes a search option selection, the application amends the user search code value and displays the graphical interface necessary for the next user selection. If the user selects a hierarchical grouping, the server application amends a user search code value to reflect the selection and displays the next hierarchical level to the user. If the user selects a new axis, the server application amends a user search code value to reflect the selection and displays the next hierarchical level available in the new axis. Advantageously, a user may also choose to return to a previous node.

In preferred embodiments, a graphical representation of each node previously selected for the search in progress is available to the user for selection. In this way, a user may return to any point in the search option selection process at each iteration. If the user elects to return to a previous node, the server application amends a user search code value to reflect the selected node's value and displays the next hierarchical level of the axis for the node selected.

In the embodiment illustrated, the user may advantageously elect to run the search and receive hyperlinks to a target set of hypermedia content at any iteration of the search process. In an alternative embodiment, the server application is monitoring the hyperlinks that will be returned by the search and automatically displays the hyperlink set when the set meets predetermined criteria, such as a reasonable number of hyperlinks to display. Once the user selects a hyperlink, the server application website navigates the user to the selected URI. Advantageously, the user may also opt to return to a previous node and the process continues by the server application amending a user search code value to reflect the selected node's value and displaying the next hierarchical level of the axis for the node selected.

Figure 7:
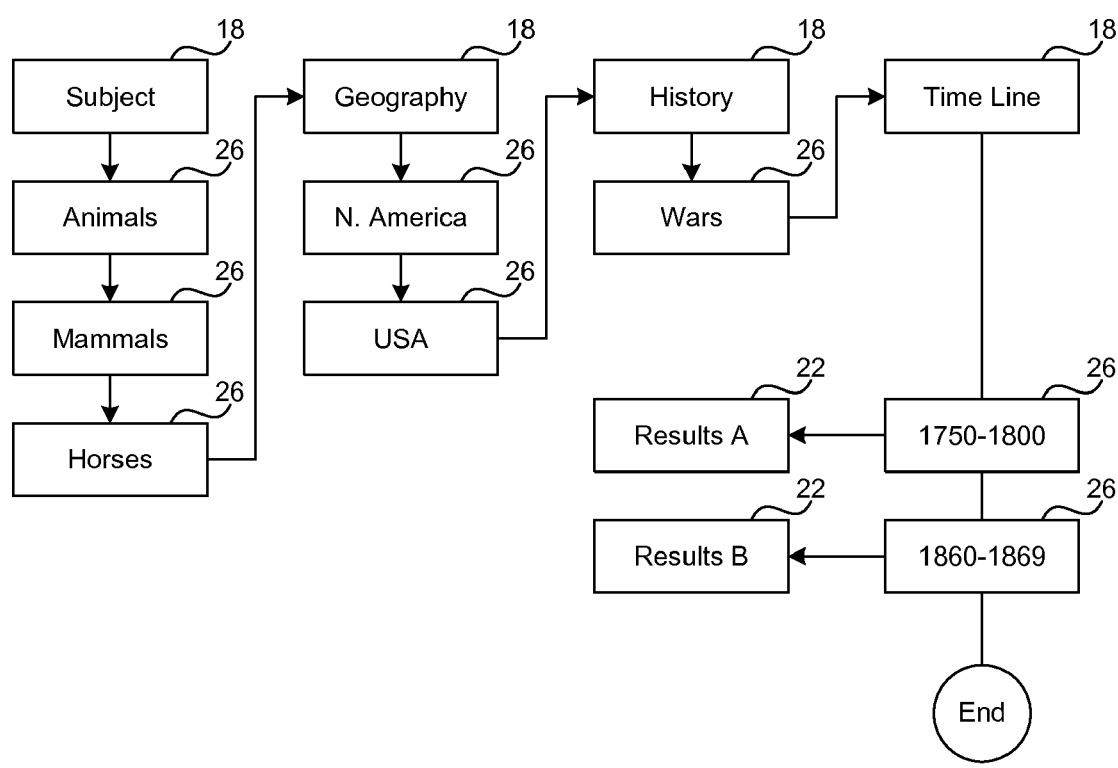
FIG. 7 is a block diagram of a process within the disclosed system.

FIG. 7 illustrates in block diagram a user's process in conducting searches for hypermedia content relating to horses in the United States during the American Revolutionary War and the American Civil War. Illustrated are axes 18, hierarchical groupings 26 and sets of hyperlinks representing target sets of URI 22. Each block represents a user selection for search options. With each selection, the server application amends the user search code value and displays the next appropriate selections. The user begins with a root hierarchical level in subject axis 18, selecting first an animals hierarchical grouping 26, then hierarchical groupings for mammals 26 and horses 26 from the subsequent hierarchical levels displayed. The user then selects the geography axis 18 and from the hierarchical groupings displayed for that axis, selects North America 26, then USA 26. The user then opts to move to an axis for history 18 and selects wars 26 from the hierarchical groupings displayed. Moving to a time line axis 18, the user investigates the time period of the American Revolutionary War by selecting the hierarchical grouping for the years 1750 to 1800. Upon selecting to run the search and view results, a display is made to the user of hyperlinks, but only hyperlinks to hypermedia content containing references to horses during the American Revolutionary War's time period. At this time, a user may return to the previous node, the axis for time line 18. A display is made to the user of hierarchical groupings one of which is the 1860 to 1869 time period 26. Upon selecting this, a display is made to the user of hyperlinks, but only hyperlinks to hypermedia content containing references to horses during the American Civil War's time period.

Figure 8:
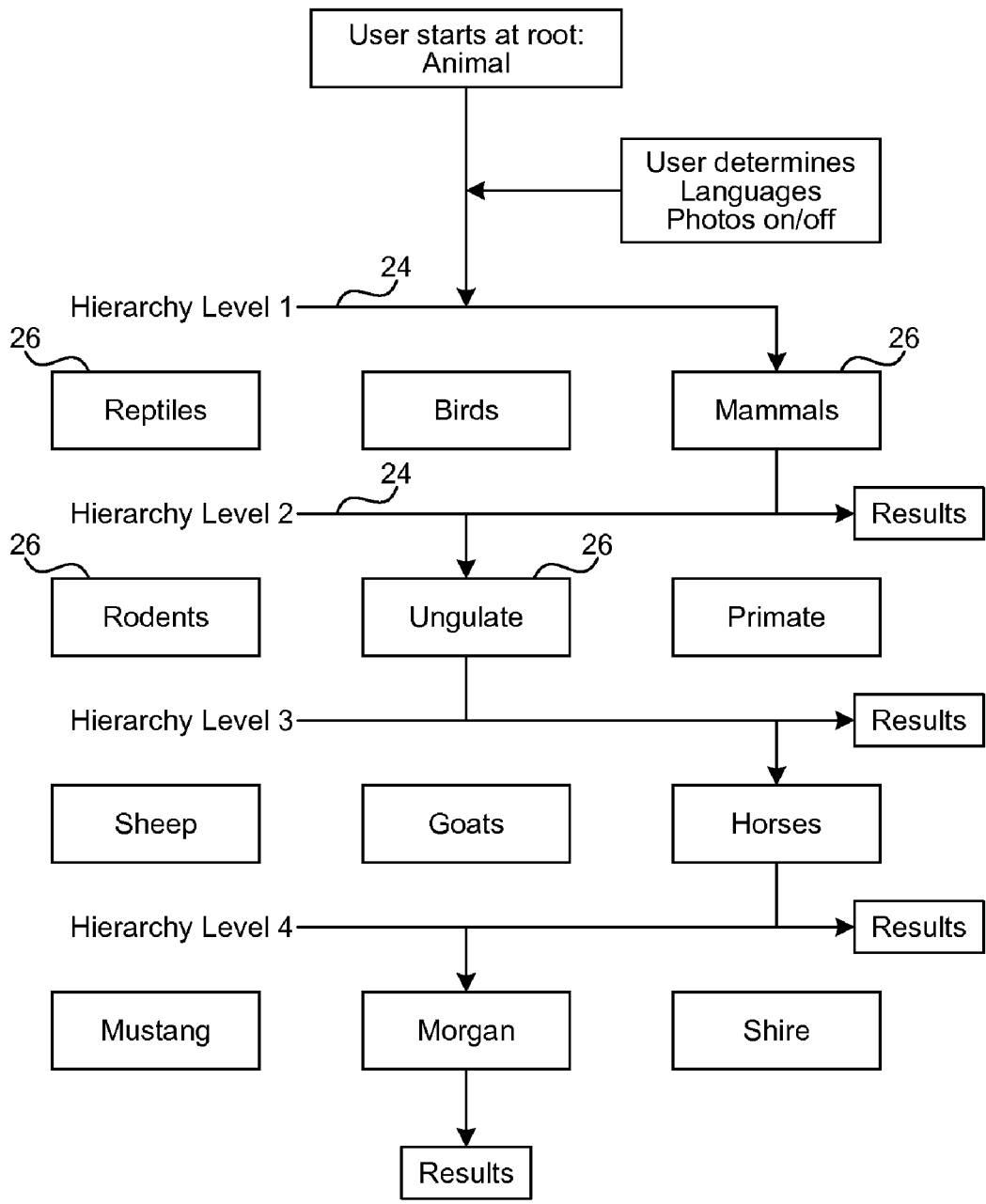
FIG. 8 is a block diagram of a process within the disclosed system.

FIG. 8 illustrates in block diagram a user's process in conducting a search, similar to FIG. 7. In FIG. 8, the categorization of hierarchical groupings 26 into hierarchical levels 24 is seen. A user begins at a root where, in this embodiment, the user selects the language to be used for labeling of images and whether photos should be downloaded and displayed as part of this session's graphical interface. The user is presented with three hierarchical groupings 26 for a first hierarchical level 24. Upon selecting the hierarchical grouping mammals, the user is displayed a $2^{nd}$ hierarchical level 24 containing a set of hierarchical groupings 26 which are each a subset of that of the hierarchical grouping mammals, the hierarchical groupings 26 being rodents, ungulate and primate. The user selects one and the process continues similarly through 2 more hierarchical levels 24, at which point the user opts to view the results of his search selections. In the illustrated case, the user will be returned hyperlinks to hypermedia content relating to only the Morgan horse.

An alternate system also includes a CD containing the pre-built index Key (CD Key). The CD Key is a pre-built and unchanging series of navigational pathways with predetermined values for each crossroad, or branch, along the way. The CD Key is used in any Personal Computer (PC) with a mouse. The CD Key contains a Search Parameter Code Developer (SPCD), which develops the code to drill into the front end database. It also includes dedicated custom software that prepares the code for transmission to server (DCS) and various servers providing transmission, spidering, database, and management (Server). Spiders to search the Internet for building and updating the database with raw data (Spider) are included, as well as a Subject Matter Indexed Database (SMID) located on remote server, where the CD Key and the SMID use matched, or dovetailed, structure. Advantageously, an Automated Subject Matter Indexing program (ASMI) defines the Index per subject-matter criteria, and eliminates unrelated sites per set definitions. A Code Reader optionally applies user-specific parameters for drilling the database (CR).

In one embodiment, the CD Key is simply a Compact Disc that contains all of the database drill down structure and images. The subject matter CD Key is matched to the system of subject matter indexing. All images are local to the user (on the CD Key), allowing faster response time to load images, and reducing transfer bandwidth demand. This advantageously frees up central database server capacity dramatically, thereby allowing more users for the same available bandwidth.

CD Keys are subject matter specific, for example, including but not limited to: Family Friendly, Environment, Space, Technology, Literature, Medical, Sports, Photography, History, Science, Art, Architecture, Movies, Automotive, and Geography.

This CD Key optionally contains software for browser controls, which solves this serious problem. The user-adjustable control software restricts web access to certain web portals or subject matter codes. Additionally, these controls (along with the subject matter index) are optionally designed to restrict subject matter access, thus providing a simple solution for parental supervision.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A network system for information retrieval from a collection of hypermedia data over a distributed network comprising:
    a. a memory, at least one computer server hosting an information retrieval site and operatively connected to the distributed network;
    b. a data storage system residing upon computer readable media operatively connected to the at least one computer server, the data storage system comprising the collection of hypermedia data, the collection comprising a plurality of hyperlinks to items of hypermedia content, wherein a plurality of the hyperlinks are each associated with at least one hypermedia content code value is populated with at least one automatically generated value based on one or more topics associated with the hypermedia content;
    c. at least one input/output device through which a searcher accesses the information retrieval site, inputs retrieval data and receives selected output; and
    d. an application running on the at least one computer server, the server application configured to:
    i. receive progressive user input and iteratively build a user search code value according to the user input, wherein the building comprises:
    presenting search options to a user organized into a plurality of search axes, each axis having an assigned portion of the user search code value, each axis having nodes of intersection with other axes;
    each axis further comprising at least one hierarchy, a hierarchy comprised of levels of hierarchical groupings, the hierarchical groupings representing sets of hypermedia content, the sets being less than the entirety of the hypermedia content represented by records in the data storage system, each level of hierarchical groupings having an assigned portion of the user search code value and each hierarchical grouping having a value to be assigned to the portion;
    present nodes of intersection of the axes to users at each level of a hierarchy, allowing for selection of additional search options by users from a selected axis;
    receive input from a user selecting a hierarchical grouping and use the selection to assign the hierarchical grouping's value to the hierarchical level's assigned portion of the user search code value;
    receive input from a user selecting an axis and use the selection to generate the axis' assigned portion of the user search code value;
    ii. at least partially match the user search code value to at least a portion of at least one hypermedia content code value for a plurality of hyperlinks to identify each associated hyperlink to a particular information retrieval data set; and
    iii. display the particular information retrieval data set to the user.

2. The system of claim 1 further wherein the server application is adapted to display to the user selected non-text information retrieval input options, and the information retrieval data set returns to the user at least in part as non-text Uniform Resource Identifier hyperlinks.

3. The system of claim 1 further wherein the server application is adapted to:
    a. iteratively build a user search code value by presenting to the user selected information retrieval options organized into a hierarchy, the hierarchy comprised of levels of hierarchical groupings, the hierarchical groupings each representing sets of hypermedia content, the sets being less than the entirety of the hypermedia content represented by the hypermedia data in the data storage system, each level of hierarchical groupings having an assigned portion of the user search code value and each hierarchical grouping having a value to be assigned to the portion;
    b. receive input from the user in the form of the user selecting a hierarchical grouping, and use the grouping selection to assign the hierarchical grouping's code portion value to the hierarchical level's assigned portion of the user search code value.

4. The system of claim 1 further wherein the server application is adapted to:
    a. display to the user selected non-text information retrieval input options, and the information retrieval data set returns to the user at least in part as non-text Uniform Resource Identifier hyperlinks;
    b. iteratively build a user search code value by presenting to the user selected information retrieval options organized into a hierarchy, the hierarchy comprised of levels of hierarchical groupings, the hierarchical groupings each representing sets of hypermedia content, the sets being less than the entirety of the hypermedia content represented by the hypermedia data in the data storage system, each level of hierarchical groupings having an assigned portion of the user search code value and each hierarchical grouping having a value to be assigned to the portion;
    c. receive input from the user in the form of the user selecting a hierarchical grouping, and use the grouping selection to assign the hierarchical grouping's code portion value to the hierarchical level's assigned portion of the user search code value.

5. The system of claim 1 further wherein the server application is adapted to:
   a. display to the user selected non-text information retrieval input options, and the information retrieval data set returns to the user at least in part as non-text Uniform Resource Identifier hyperlinks;
   b. present search options to a user organized into a plurality of search axes, each axis having an assigned portion of the user search code value, and further, each axis having nodes of intersection with the other axes;
   c. each axis further comprising at least one hierarchy, a hierarchy comprised of levels of hierarchical groupings, the hierarchical groupings representing sets of hypermedia content, the sets being less than the entirety of the hypermedia content represented by the records in the data storage system, each level of hierarchical groupings having an assigned portion of the user search code value and each hierarchical grouping having a value to be assigned to the portion;
   d. present nodes of intersection of the axes to users at each level of a hierarchy, allowing for selection of additional search options by users from a selected axis;
   e. receive input from a user selecting a hierarchical grouping and use the selection to assign the hierarchical grouping's value to the hierarchical level's assigned portion of the user search code value;
   f. receive input from a user selecting an axis and use the selection to generate the axis' assigned portion of the user search code value;
   g. run a search of one or more data records referencing items of hypermedia content, matching the user search code value, the user search code value composed of both the axes' assigned portions and the hierarchical level's assigned portion, to at least a portion of the hypermedia content search code value; and
   h. present to the user another hierarchical level of hierarchical groupings composed of search return from records resulting from the search.

6. The system of claim 1 further wherein the server application is further adapted to:
   a. create a further entry of hypermedia data into the collection of hypermedia data, the further entry further comprising a hyperlink, to an item of hypermedia content, the hyperlink associated with at least one hypermedia content code value.

7. A method for information retrieval from a collection of hypermedia data over a distributed network, the method comprising:
   a. analyzing items of hypermedia content from a source of hypermedia content and building for each item a hypermedia content code value, wherein the hypermedia content code value is populated with at least one automatically generated value based on one or more topics associated with the hypermedia content;
   b. associating, by using a computer server, both the hypermedia content code value for each item and a hyperlink for each item into the collection of hypermedia data;
   c. using progressive user input to iteratively build a user search code value according to the user input, wherein the building comprises:
   presenting search options to a user organized into a plurality of search axes, each axis having an assigned portion of the user search code value, each axis having nodes of intersection with other axes;
   each axis further comprising at least one hierarchy, a hierarchy comprised of levels of hierarchical groupings, the hierarchical groupings representing sets of hypermedia content, the sets being less than the entirety of the hypermedia content represented by records in the data storage system, each level of hierarchical groupings having an assigned portion of the user search code value and each hierarchical grouping having a value to be assigned to the portion;
   present nodes of intersection of the axes to users at each level of a hierarchy, allowing for selection of additional search options by users from a selected axis;
   receive input from a user selecting a hierarchical grouping and use the selection to assign the hierarchical grouping's value to the hierarchical level's assigned portion of the user search code value;
   receive input from a user selecting an axis and use the selection to generate the axis' assigned portion of the user search code value;
   d. at least partially matching to the user search code value at least a portion of at least one hypermedia content code value to identify to a particular information retrieval data set each hyperlink associated with the matched code; and
   e. displaying the particular information retrieval data set to the user.

8. The method of claim 7 further comprising in step c, displaying to the user selected non-text information retrieval input options, and in step d returning to the user the information retrieval data set at least in part as non-text Uniform Resource Identifier hyperlinks.

9. The method of claim 7 further comprising in step c
   a. iteratively building the user search code value by presenting to the user selected information retrieval options organized into a hierarchy, the hierarchy comprised of levels of hierarchical groupings, the hierarchical groupings each representing sets of hypermedia content, the sets being less than the entirety of the hypermedia content represented by the hypermedia data in the data storage system, each level of hierarchical groupings having an assigned portion of the user search code value and each hierarchical grouping having a value to be assigned to the portion;
   b. receiving input from the user in the form of the user selecting a hierarchical grouping, and using the grouping selection to assign the hierarchical grouping's code portion value to the hierarchical level's assigned portion of the user search code value.

* * * * *